(12) United States Patent
Wolkenstein et al.

(10) Patent No.: US 9,776,588 B2
(45) Date of Patent: Oct. 3, 2017

(54) CONTROL DEVICE FOR AN OBJECT COUPLING DEVICE OF A VEHICLE, OBJECT COUPLING DEVICE FOR A VEHICLE AND METHOD FOR DAMPENING AN IMPACT OF AN INERTIALLY ACCELERATED OBJECT

(71) Applicant: Robert Bosch GmbH, Stuttgart (DE)

(72) Inventors: Maja Wolkenstein, Sachsenheim (DE); Gian Antonio D'Addetta, Stuttgart (DE); Josef Kolatschek, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 14/783,224

(22) PCT Filed: Mar. 14, 2014

(86) PCT No.: PCT/EP2014/055157
§ 371 (c)(1),
(2) Date: Oct. 8, 2015

(87) PCT Pub. No.: WO2014/166699
PCT Pub. Date: Oct. 16, 2014

(65) Prior Publication Data
US 2016/0046251 A1 Feb. 18, 2016

(30) Foreign Application Priority Data
Apr. 12, 2013 (DE) .......... 10 2013 206 508

(51) Int. Cl.
*B60R 21/0134* (2006.01)
*B60L 3/00* (2006.01)
(Continued)

(52) U.S. Cl.
CPC ............ *B60R 21/0134* (2013.01); *B60K 1/04* (2013.01); *B60L 3/0007* (2013.01); *B60L 3/0046* (2013.01);
(Continued)

(58) Field of Classification Search
None
See application file for complete search history.

(56) References Cited

U.S. PATENT DOCUMENTS 4,174,014 A * 11/1979 Bjorksten ................ B60K 1/04
180/68.5
4,365,681 A * 12/1982 Singh ...................... B60K 1/04
105/51

(Continued)

FOREIGN PATENT DOCUMENTS

CN 202294220 U 7/2012
DE 197 38 620 C1 12/1998
(Continued)

OTHER PUBLICATIONS

International Search Report corresponding to PCT Application No. PCT/EP2014/055157, mailed Dec. 9, 2014 (German and English language document) (7 pages).

*Primary Examiner* — Jonathan M Dager
(74) *Attorney, Agent, or Firm* — Maginot, Moore & Beck LLP

(57) ABSTRACT

A control device for an object coupling device of a vehicle is configured to actuate a dampening device of the object coupling device such that an object moved by an inertial force from a fixing position along a specified target route to a target impact component of the vehicle can be delayed. The control device is additionally configured to determine a target operating mode of the dampening device from at least two executable operating modes of the dampening device having a different time difference between an exit time of the (Continued)

object from the fixing position and an insert time of a delay of the object to be executed by the dampening device and to control the dampening device into the target operating mode via the at least one control signal.

15 Claims, 5 Drawing Sheets

(51) Int. Cl.
*B60L 11/18* (2006.01)
*B60K 1/04* (2006.01)
*B60R 21/36* (2011.01)
*B60R 21/01* (2006.01)

(52) U.S. Cl.
CPC ....... *B60L 11/1877* (2013.01); *B60L 11/1879* (2013.01); *B60R 21/36* (2013.01); *B60K 2001/0438* (2013.01); *B60K 2001/0494* (2013.01); *B60L 2240/12* (2013.01); *B60L 2240/14* (2013.01); *B60L 2240/26* (2013.01); *B60L 2240/70* (2013.01); *B60L 2240/80* (2013.01); *B60R 2021/01231* (2013.01); *B60Y 2306/01* (2013.01); *Y02T 10/7005* (2013.01); *Y02T 10/705* (2013.01); *Y02T 10/7291* (2013.01); *Y02T 90/16* (2013.01)

(56) References Cited

U.S. PATENT DOCUMENTS

| 5,518,271 | A | * | 5/1996 | Bell | B60N 2/4221 |
| | | | | | 180/274 |
| 5,555,950 | A | * | 9/1996 | Harada | H01M 2/1083 |
| | | | | | 180/232 |
| 6,059,354 | A | * | 5/2000 | Rajasingham | B60N 2/06 |
| | | | | | 296/187.12 |
| 6,158,538 | A | * | 12/2000 | Botzelmann | B60K 1/04 |
| | | | | | 180/65.1 |
| 7,614,469 | B2 | * | 11/2009 | Kumar | H01M 2/1077 |
| | | | | | 180/68.5 |
| 7,641,013 | B2 | * | 1/2010 | Kim | B60R 16/04 |
| | | | | | 180/68.5 |
| 8,540,282 | B2 | * | 9/2013 | Yoda | B60K 1/04 |
| | | | | | 180/232 |
| 9,242,540 | B2 | * | 1/2016 | Shirooka | B60K 1/04 |
| 2010/0320012 | A1 | * | 12/2010 | Stappen | B60K 1/04 |
| | | | | | 180/65.1 |
| 2011/0011664 | A1 | * | 1/2011 | Baumann | B60R 21/0134 |
| | | | | | 180/282 |
| 2012/0150393 | A1 | * | 6/2012 | Knight-Newbury | B60L 3/04 |
| | | | | | 701/45 |
| 2013/0017421 | A1 | * | 1/2013 | Onnerud | B60R 21/01 |
| | | | | | 429/61 |
| 2013/0054103 | A1 | * | 2/2013 | Herink | B60T 7/22 |
| | | | | | 701/65 |
| 2014/0170447 | A1 | * | 6/2014 | Woehrle | A62C 3/07 |
| | | | | | 429/61 |
| 2015/0053492 | A1 | * | 2/2015 | Kolatschek | B60K 1/04 |
| | | | | | 180/68.5 |
| 2015/0357681 | A1 | * | 12/2015 | Kwon | H01M 10/6572 |
| | | | | | 429/9 |

FOREIGN PATENT DOCUMENTS

| DE | 10 2009 025 430 B3 | 2/2011 |
| DE | 10 2009 053 138 A1 | 5/2011 |
| DE | 10 2010 033 123 A1 | 2/2012 |
| DE | 10 2011 113 492 A1 | 4/2012 |
| DE | 10 2011 105 490 A1 | 12/2012 |
| DE | 10 2011 082 731 A1 | 3/2013 |
| EP | 0 559 176 A1 | 9/1993 |

* cited by examiner

CONTROL DEVICE FOR AN OBJECT COUPLING DEVICE OF A VEHICLE, OBJECT COUPLING DEVICE FOR A VEHICLE AND METHOD FOR DAMPENING AN IMPACT OF AN INERTIALLY ACCELERATED OBJECT

This application is a 35 U.S.C. §371 National Stage Application of PCT/EP2014/055157, filed on Mar. 14, 2014, which claims the benefit of priority to Serial No. DE 10 2013 206 508.6, filed on Apr. 12, 2013 in Germany, the disclosures of which are incorporated herein by reference in their entirety.

The disclosure concerns a control device for an object coupling device of a vehicle. The disclosure also concerns an object coupling device for a vehicle. Moreover, the disclosure concerns a method for dampening an impact of an inertially accelerated object.

BACKGROUND

A supporting structure for an electric vehicle is described in EP 0 559 176 A1. A plurality of batteries can be disposed in the supporting structure such that during a crash of the electric vehicle the batteries can be displaced from their respective fixing position along a predefined target route to a target impact component. In this way, the braked mass should be able to be at least partly reduced during the crash.

SUMMARY

The disclosure concerns a control device for an object coupling device of a vehicle and a method for dampening an impact of an inertially accelerated object.

The term "object coupling device" can also mean an object coupling device and/or a mass coupling device.

The present disclosure realizes a plurality of options for dampening an impact of the object on the target impact component, wherein in particular the procedure can be selected that guarantees minimum damage in relation to the present crash conditions. If for example the crash is associated with a high risk of injury for the vehicle occupants, by means of the present disclosure the start of the dampening can be delayed in time in order to guarantee that the mass of the object is fully decoupled from the rest of the mass of the vehicle. As explained in more detail below, a higher acceleration of the rest of the mass can be guaranteed in this way during an initial crash phase. If, however, there is no risk of injury for vehicle occupants during a crash/a rapid braking of the vehicle, by means of the present disclosure the dampening of the object can be started early such that gentle dampening can be carried out that does not damage the possibly very sensitive object. Thus costs that otherwise occur during a short-duration, strong dampening of the object shortly before contact with the target impact component can be saved because of the protection of the object during the dampening. The present disclosure can thus optionally guarantee optimal occupant protection or optimal object protection.

The subject matter of the present disclosure can be used for a vehicle battery. In particular, in the case of an electric vehicle or a hybrid vehicle the vehicle battery has a disproportionately large mass component in comparison to the total mass of the vehicle. For example, a vehicle battery for such a type of vehicle can have a mass of a several 100 kg, such as for example 100-400 kg. The mass component the vehicle battery can frequently be up to 30% of the total vehicle mass. By means of the present disclosure, however, it can be ensured that the high mass does not represent a potential risk in the case of a sudden deceleration, of an accident and/or of a crash of the vehicle. It is to be noted, however, that the applicability of the subject matter of the present disclosure is not limited to a vehicle battery. Similarly, the applicability of the present disclosure is not limited to a hybrid vehicle or an electric vehicle.

In an advantageous embodiment, the control device is configured to determine the respective onset time of the target operating mode and/or the respective time difference between the exit time and the onset time of the target operating mode taking into account the at least one sensor signal and to activate the dampening device at the onset time by means of the at least one control signal. Dampening can thus optionally be started either very early with a (gentle) dampening of the object displaced along the target route or with a dampening (that causes a relatively high dampening force on the object) only after waiting for a predefined time period. In particular, for this it can be taken into account whether protection of the object against a dampening force exerted thereon by means of the dampening or delayed dampening in order to guarantee better protection of the vehicle occupants is more advantageous.

Preferably, the control device is configured to activate at least one gas generator, at least one closure device, at least one valve and/or at least one igniter of the dampening device by means of the at least one control signal such that a gas flow can be initiated in at least one inflatable device of the dampening device and/or in a volume disposed between the object and the target impact component. In this way it can be safely guaranteed that the desired dampening can be exerted on the object rapidly and reliably from the preferred onset time.

In an advantageous development, the control device is additionally configured to determine at least one target variable in relation to a target power of the at least one gas generator, a target opening duration and/or a target size of opening gap of the at least one closure device, a target opening duration and/or a target size of the opening gap of the at least one valve, a target number of the gas generators and/or igniters to be activated and/or a target number of the closure devices and/or valves to be opened taking into account the at least one sensor signal. Thus not only the start of the dampening, but also the dampening strength can be optimized in relation to the at least one sensor signal.

In a further advantageous embodiment, the control device is additionally configured to determine the exit time of the object from the predefined fixing position taking into account the at least one sensor signal and to activate an object fixing device of the object arranging device such that the object can be released by the activated object fixing device at the determined exit time. The control device can thereby also be used to decouple the object from the vehicle.

The aforementioned advantages are also guaranteed with a dampening device that can work in conjunction with the corresponding control device.

In an advantageous embodiment, the dampening device comprises at least one gas generator, at least one closure device, at least one valve and/or at least one igniter, which can be activated by means of the at least one control signal such that a gas flow can be initiated in at least one inflatable device of the dampening device and/or in a volume disposed between the object and the target impact component. The dampening device can thus be implemented inexpensively. Moreover, standard methods can be used to manufacture the dampening device. An advantageous quality is thus guaranteed, even with mass production of the dampening device.

For example, the dampening device comprises as the at least one inflatable device at least one airbag, at least one belt-integrated airbag and/or at least one inflatable metal structure. A number of possible embodiment options for the dampening device can thus be achieved, wherein recourse can be made to frequently used components.

Advantageously, by means of the dampening device an occupant protection mode can be achieved, in which the object displaced from the fixing position can first be displaced along a first sub path of the predefined target route without dampening and can then be decelerated with a first deceleration force along a second sub path of the predefined target route by means of the dampening device. Moreover, by means of the dampening device an object protection mode can additionally be implemented, in which the object displaced from the fixing position can be decelerated along the predefined target route by means of the dampening device with a second deceleration force that is smaller than the first deceleration force. Thus, depending on the situation a selection can be made between optimized occupant protection and, if there is no risk of injury for the vehicle occupants, optimized object protection.

In an advantageous development the object fixing device can be controlled from a first mode, in which the object can be fixed by means of the object fixing device in the fixing position, into a second mode such that the object can be released from the fixing position starting from the control of the object fixing device in the second mode. In particular, the object fixing device can be controlled by means of the control device from the first mode into the second mode. Owing to said multifunctionality, additional control electronics for switching the object fixing device can be omitted in the control device.

Moreover, the object coupling device can comprise a guide structure, by means of which the object that can be displaced by means of the inertial force can be guided along the predefined target route. A preferred target route of the object can thus be specifically predetermined.

In an advantageous embodiment the dampening device comprises the control device described above.

The described advantages can also be achieved by the method for the dampening of an impact of an inertially accelerated object. It is noted that the method according to the aforementioned embodiments can be further developed.

BRIEF DESCRIPTION OF THE DRAWINGS

Further features and advantages of the present disclosure are described below using the figures. In the figures.

DETAILED DESCRIPTION

FIGS. 1a to 1j show schematic representations and coordinate systems for describing a first embodiment of the control device and the object coupling device.

Figure 1A:
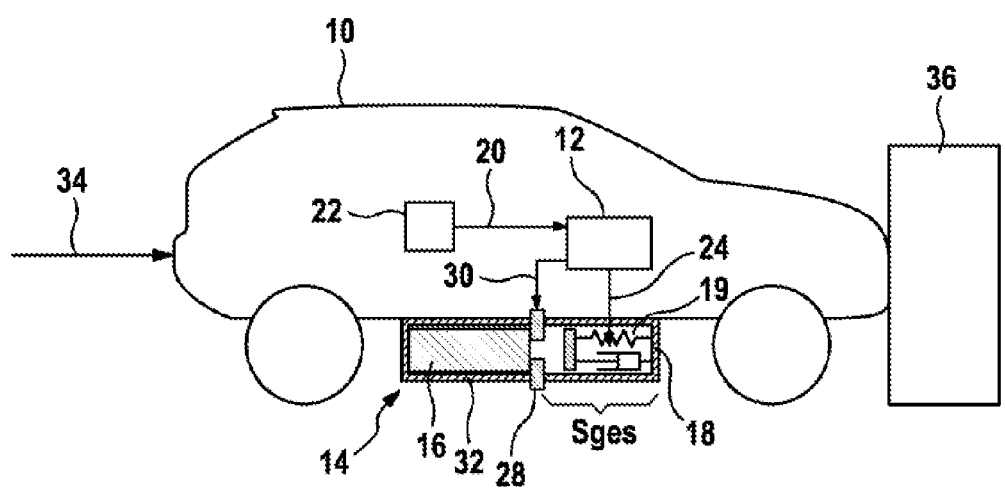
FIGS. 1a to 1j show schematic representations and coordinate systems for describing a first embodiment of the control device and the object coupling device.

The vehicle 10 schematically represented in FIG. 1a is equipped with a control device 12 and an object coupling device 14. The object coupling device 14, which is only schematically represented in FIG. 1a, is configured for an object 16 that can be fixed in a predefined fixing position on and/or in the object coupling device 14 during normal travel of the vehicle 10. In the event of a strong deceleration of the vehicle 10, an accident and/or a crash the object 16 can be displaced by means of an inertial force from the fixing position along a predefined target route Sges to a target impact component 18 (of the object coupling device 14 and/or of the vehicle 10). Moreover, the object coupling device 14 can be activated by means of the control device 12 such that the control device 12 and a dampening device 19 of the object coupling device 14 can work in conjunction with each other.

The control device 12 can for example be integrated within the object coupling device 14. As an alternative thereto, the object coupling device 14 and the control device 12 can also be in the form of two units that can be disposed on the vehicle 10 so as to be spatially separated.

The object 16 can for example be a vehicle battery. The vehicle battery disposed in the object coupling device 14 can in particular be in the form of a uniform stiff block in the region of the underbody of the vehicle 10 (ideally between the front and rear axles). This enables the overall center of gravity of the vehicle 10 to be lowered. It is to be noted, however, that the control device 12 and the object coupling device 14 are not limited to an object 16 in the form of a vehicle battery or to a defined arrangement of the object 16 on and/or in the vehicle 10 by means of the object coupling device 14.

The control device 12 and the object coupling device 14 can also be configured for a plurality of objects 16. The mention of only the one object 16 is only used for better comprehension. The object coupling device 14 can also mean an object coupling device and/or a mass coupling device.

The control device 12 is designed to activate the dampening device 19 of the object coupling device 14 by means of at least one control signal 24, taking into account at least one provided sensor signal 20 of at least one vehicle's own sensor 22, such that the object 16 that can be fixed in the predefined fixing position on and/or in the object coupling device 14 during normal travel of the vehicle 10, and that can be displaced by means of an inertial force from the fixing position along the predefined target route Sges to the target impact component 18, can be decelerated by means of the activated dampening device 19 prior to contact of the object 16 with the target impact component 18. Moreover, the control device 12 is configured to, taking into account the at least one sensor signal 20, determine a target operating mode of the dampening device 19 from at least two operating modes of the dampening device 19 that can be implemented. The at least two operating modes of the dampening device 19 that can be implemented comprise a different time difference Δt between an exit time t0 of the object 16 from the fixing position and an onset time ta of a deceleration/braking of the object 16 implemented by means of the activated dampening device 19. The dampening device 19 can be controlled into the specified target operating mode by means of the at least one control signal 24.

Thus the deceleration/braking/slowing of the object 16 can already be started within a time interval between the onset time ta of the dampening device 19 and a starting contact/impact of the object 16 on the target impact component 18. This guarantees a significantly dampened impact of the object 16 on the target impact component 18, and hence a gentler recoupling of the object 16 with the rest of the vehicle's mass.

Moreover, the onset time ta, or the time difference Δt between the exit time t0 and the onset time ta, can be determined by specifying the target operating mode of the dampening device 19 such that a deceleration mode/braking mode that is optimized in relation to the at least one sensor signal 20 can be performed. The respective advantages of the various procedures during dampening/deceleration of the object 16 will be discussed below.

The at least one vehicle's own sensor 22 can for example be at least one speed sensor, at least one acceleration sensor, at least one pressure sensor and/or at least one crash sensor. At least one precrash sensor and/or at least one driver assistance sensor can also be used as the at least one vehicle's own sensor 22. The at least one vehicle's own sensor 22 is for example a mono, stereo, video, LIDAR and/or radar sensor. The at least one vehicle's own sensor 22 can also comprise a camera. Combinations of the sensor types mentioned here and/or other visually based sensors can also be used for the at least one vehicle's own sensor 22. The at least one vehicle's own sensor 22 can be fixedly installed in the vehicle 10 and/or can be made available by means of mobile terminals.

A speed of the vehicle 10, an acceleration of the vehicle 10, a pressure occurring in at least one sub volume of the vehicle 10 and/or a crash intensity of a crash of the vehicle 10 can thus be taken into account during the determination of the target operating mode by means of the control device 12. A crash severity of a collision and/or information about a collision opponent, such as for example its speed, its weight, its size, its dimension and/or its load state can also be taken into account during the determination of the target operating mode by means of the control device 12. Information relating to a load state of the collision opponent can for example also comprise an (additional) load mass, a number of vehicle occupants and/or a weight of the vehicle occupants.

In addition, precrash information, hotspot information re accident black spots, car2car information and/or car2x information can be taken into account during the determination of the target operating mode by means of the control device 12. Information that can be taken into account can also be exchanged by means of a suitable information exchange between the vehicle 10 and the other vehicle, in particular by means of GPS. Accordingly, a deceleration mode/braking mode that is optimized in respect of at least one of said variables can also be determined by the control device 12 and can be performed by means of the activated dampening device 19.

The onset time ta of the dampening device 19 preferably means a point in time from which the activated dampening device 19 exerts a decelerating action/force on the object 16. The onset time ta generally occurs before the impact of the object 16 on the target impact component 18. The onset time ta can be the same as an activation time of the dampening device 19. The dampening device 19 can, however, also be activated at an activation time before the onset time ta, although the decelerating action/force on the object 16 only starts at the later onset time ta. The time difference Δt means a time period between the exit time t0 of the object 16 from its fixing position and the onset time ta (the onset of the action/force of the dampening device 19). As will be explained in greater detail below, the exit time t0 can be determined or specified by the control device 12.

For example, the control device 12 can be configured to (directly) determine the respective onset time ta of the target operating mode and/or the respective time difference Δt between the exit time t0 and the onset time ta of the target operating mode, taking into account the at least one sensor signal 20, and to activate the dampening device 19 at the determined onset time ta by means of the at least one control signal 24. Examples of dampening devices 19 that can be rapidly activated are described below. Instead of a direct determination of the onset time ta and the time difference Δt, the control device 12 can however also determine a suitable operating mode as the target operating mode.

As will be explained in greater detail below, the control device 12 can be configured to activate at least one gas generator, at least one closure device, at least one valve and/or at least one igniter of the dampening device 19 by means of the at least one control signal 24 such that a gas flow (for example an air flow) can be initiated in at least one inflatable device 26 of the dampening device 19 and/or in a volume disposed between the object 16 and the target impact component 18. Rapid activation of the dampening device 19 can be effected by such an activation.

In particular, the control device 12 can be configured to determine at least one target variable relating to a target power of the at least one gas generator, a target opening duration and/or a target size of the opening gap of the at least one closure device, a target opening duration and/or a target size of the opening gap of the at least one valve, a target number of the gas generators and/or igniters to be activated and/or a target number of the closure devices and/or valves to be opened, taking into account the at least one sensor signal 20. A strength and/or a total volume of the gas flow caused in the at least one inflatable device 26 can thus be specifically determined. In this way an inflation volume and/or a strength of the at least one inflatable device 26 can also be selected within a range of values, wherein reliable maintenance of the respective selected value is guaranteed. The onset time to from which a contact between the object and the at least one at least partly inflatable device 26 occurs can also be determined by means of the inflation volume. Moreover, a force exerted on the object 16 for deceleration/braking can be predetermined by the selection of the strength of the at least one at least partly inflatable device 26.

The object coupling device 14 schematically represented in FIG. 1a comprises an object fixing device 28, by means of which the object 16 can be fixed in the predefined fixing position on and/or in the object coupling device 14 during normal travel of the vehicle 10. The object fixing device 28 can be controlled from a first mode, in which the object 16 can be fixed in the fixing position by means of the object fixing device 28, into a second mode such that the object 16 can be released from the fixing position from the control of the object fixing device 28 into the second mode. The object fixing device 28 is preferably designed such that the object 16 remains motionless in the fixing position during normal travel of the vehicle 10. By contrast, control of the object fixing device 28 into its second mode causes the object 16 to be released from the fixing position. The object fixing device 28 can for example be a mechanical element. Other design options for the object fixing device 28 are also possible.

The control device 12 can optionally be configured to determine the exit time t0 of the object 16 from the predefined fixing position taking into account the at least one provided sensor signal 20. For example, a sudden braking of the vehicle 10, an accident and/or a crash can be detected by means of the control device 12 by analyzing the at least one provided sensor signal 20. In this case the object fixing device 28 of the object arranging device 14 can be activated by means of a further control signal 30 of the control device 12 so that the object 16 can be released by the activated object fixing device 28 at the specified exit time t0. The object fixing device 28 can thus be controlled from the first mode into the second mode at the exit time t0 by means of the control device 12. Owing to said multifunctionality of the control device 12, additional electronics for activating the object fixing device 28 can be omitted.

It is however noted that the object 16 can also be optionally mechanically disposed in the fixing position by means of the object fixing device 28 so that it can only be displaced from the fixing position as a result of an inertial force exceeding the adhesion. In this case the exit time t0 can be determined by means of a suitable sensor system.

In the embodiment of FIG. 1a the object coupling device 14 also comprises a guide structure 32, by means of which the object 16 that is displaceable by means of the inertial force can be guided along the predefined target route Sges. The guide structure 32 is preferably designed so that the object 16 decoupled from the rest of the vehicle mass can be displaced in a direction of travel 34/away from an impact obstruction 36 of the vehicle 10. This can be reliably achieved by a suitable use of slide bearings and/or roller bearings. Moreover, the object coupling device 14 can be designed such that the object 16 is well protected by a surrounding supporting structure or as a supporting structure itself can contribute to the protection of the passenger compartment. The build options of the object coupling device 14 are however not limited to fitting with a guide structure 32 or with a defined supporting structure.

Figure 1B:
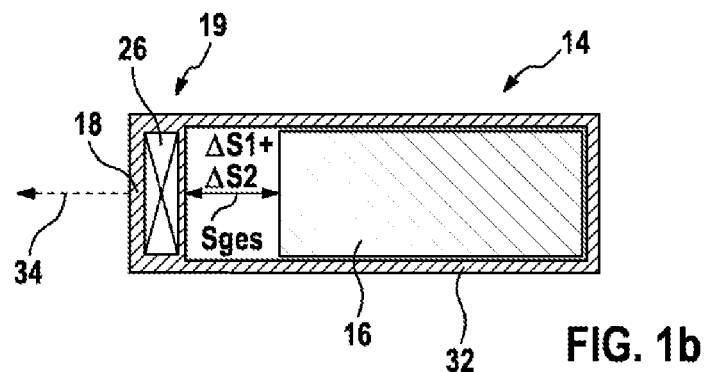

The dampening device 19 of the object coupling device 14 is schematically represented in FIG. 1b. The dampening device 19 can be activated by means of the at least one control signal 24 of the control device 12 so that the object 16 that can be moved by means of an inertial force from the fixing position along the predefined target route Sges to a target impact component 18 can be decelerated/braked by means of the activated dampening device 19 prior to contact of the object 16 with the target impact component 18. Moreover, the dampening device 19 can be controlled by means of the at least one control signal 24 into a target operating mode of at least two operating modes of the dampening device 19 that can be implemented with a different time difference Δt between the exit time t0 of the object 16 from the fixing position and the onset time ta (of the deceleration of the object 16 to be carried out by means of the activated dampening device 19).

The dampening device 19 of FIGS. 1a to 1j comprises at least one gas generator, at least one valve, at least one closure device and/or at least one igniter, which can be activated by means of the at least one control signal 24. In this way a gas flow (for example an air flow) can be initiated in the at least one inflatable device 26 of the dampening device 19. As the at least one inflatable device 26, the dampening device 19 of FIGS. 1a to 1j comprises an airbag 26 that is disposed on the target impact component 18. Further design options for the inflatable device 26 and the dampening device 19 are described below.

The dampening device 19 implements an energy absorption system, by means of which it is possible to convert the kinetic energy of the object 16 displaced by means of the inertial force wholly or partly into deformation and/or heat. In particular, the use of at least one inflatable device 26, such as for example of an airbag 26, enables a gentle deceleration and hence a gentle recoupling of the object 16 to the rest of the structure of the vehicle.

With the embodiment of FIGS. 1a to 1j, the dampening device 19 can optionally be operated in a first operating mode with a time difference Δt that is non-zero between the exit time t0 and the subsequent onset time ta, or in a second operating mode with a time difference Δt that is equal to zero (the onset time ta is the same as the exit time t0).

Figure 1C:
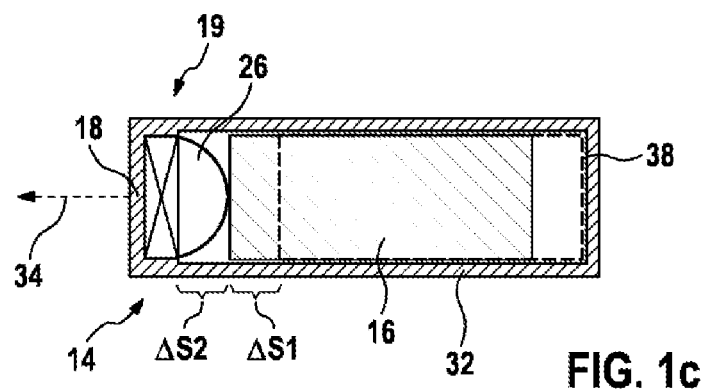
Figure 1D:
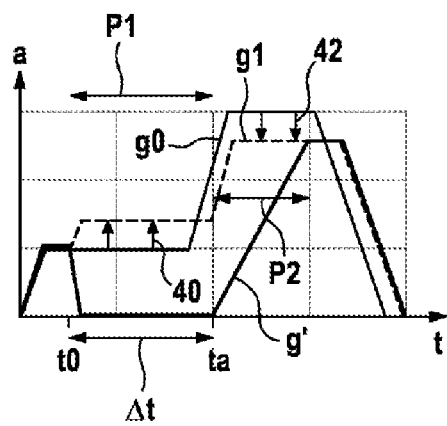
Figure 1E:
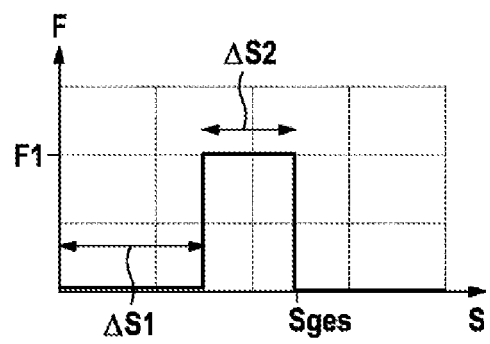

FIGS. 1c to 1e represent dampening with which there is a non-zero time difference Δt between the exit time t0 of the object 16 from the fixing position represented by the dashed line 38 and the onset time ta of the dampening device 19. An abscissa of the coordinate system of FIG. 1d is the time axis t. An acceleration is indicated by means of an ordinate of the coordinate system of FIG. 1d. An abscissa of the coordinate system of FIG. 1e corresponds to a displacement distance s of the object 16 from its fixing position. A deceleration force F exerted on the object 16 during said displacement is represented by means of an ordinate of the coordinate system of FIG. 1e.

Up to the exit time t0 the object 16 is fixedly connected to the vehicle 10 and thus increases the mass of the vehicle. At the exit time t0 the object fixing device 28 is activated because of a detected crash so that the object fixing device 28 releases the object 16. The object 16 is thus displaced from the fixing position along the direction of travel 34 from the exit time t0. However, the dampening device 19 is not yet exerting any action/dampening on the object 16 at the exit time t0. The displaced object 16 can thus first be displaced along a first sub path Δs1 of the predefined target route Sges without dampening. This can also be described as follows: that the object 16 can be displaced by means of the inertial force without dampening during a first phase P1/the time difference Δt. The object 16 can thus move without force in the direction of travel 34 in said first phase P1.

It is expressly pointed out that in said first phase P1 the dampening device 19 is exerting no force on the object 16 during the time difference Δt. Therefore the object 16 is fully decoupled from the rest of the mass of the vehicle 10 during its displacement by the first sub path Δs1/during the time difference Δt. The duration of the first phase P1 is equal to the time difference Δt. A length of the first sub path Δs1 of the predefined target route Sges also corresponds to the time difference Δt. The first sub distance Δs1 can for example have a length between 1.5 and 3.5 cm.

During the first phase P1, which starts at the exit time t0, the object 16 is separated from the rest of the vehicle mass of the vehicle 10. An acceleration a of the rest of the vehicle mass occurring during the first phase P1 after decoupling of the object 16 is represented by means of a graph g1 in the coordinate system of FIG. 1d. An acceleration a that the vehicle 10 would have without decoupling of the object 16 is shown for comparison with the graph g0. As can be seen from a comparison of the graphs g1 and g0, the (complete) decoupling of the mass of the object 16 from the rest of the vehicle mass causes an increase 40 of the acceleration a during the first phase P1. (The graph g' represents an acceleration a of the object 16.)

The increased acceleration a of the rest of the vehicle mass during the first phase P1/the time difference Δt ensures that the point in time of triggering the belt tensioner and the airbags in the passenger compartment is not displaced in time (a displacement of the point in time of triggering the belt tensioner and the airbags in the passenger compartment could degrade the occupant retention of the vehicle 10). Thus reliable triggering of the belt tensioner and the airbags in the passenger compartment when required is reliably guaranteed because of the complete decoupling of the mass of the object 16, in particular in the initial phase (between 0 and approx. 30 ms) of the crash process, which is important for the sensor system. This can also be expressed as that the vehicle impulse and hence the loading on the vehicle occupants during the initial phase of the crash can be significantly reduced owing to the complete decoupling of the mass of the object 16.

The first phase ends with the onset time ta of the action of the dampening device 19. For example, the object 16 contacts the inflatable device 26 from the onset time ta (see FIG. 1c). From the onset time ta the object 16 can therefore be decelerated along a second sub path $\Delta s2$ of the predefined target route Sges with a first deceleration force F1 by means of the activated dampening device 19. A second phase P2 thus starts with the onset time ta, the displaced object 16 being braked with the first deceleration force F1 during said second phase P2. The first deceleration force F1 can be selected to be relatively high, so that despite the short dampening duration/the short sub path $\Delta s2$ the subsequent impact of the object 16 on the target impact component 18 can be significantly dampened. For example, the first dampening force F1 can be at least 100 kN, in particular at least 200 kN. The object 16 is coupled to the vehicle 10 again by means of the first dampening force F1. Therefore the common acceleration a of the vehicle 10 with the recoupled object 16 during the second phase P2 has a reduction 42.

The operating mode represented by means of FIGS. 1c to 1e implements an occupant protection mode with a strategy in which the protection of the occupants takes priority. In order to reduce the loading on the occupants, the at least one object 16 is temporarily decoupled from the rest of the vehicle mass so that during said time interval not the entire mass of the vehicle, but only a reduced part/the rest of the vehicle mass is braked. In this way the impact impulse can be influenced so that the load acting on the at least one vehicle occupant can be reduced. The occupant protection mode thus guarantees that despite its high mass the object 16 does not represent a danger to the vehicle occupants. With said strategy the object 16 may be destroyed in the worst case. Because of the selection of the occupant protection mode taking into account the at least one sensor signal 20, it is reliably guaranteed that the occupant protection mode is only selected if there is otherwise too great a risk of injury for the vehicle occupants.

Figure 1F:
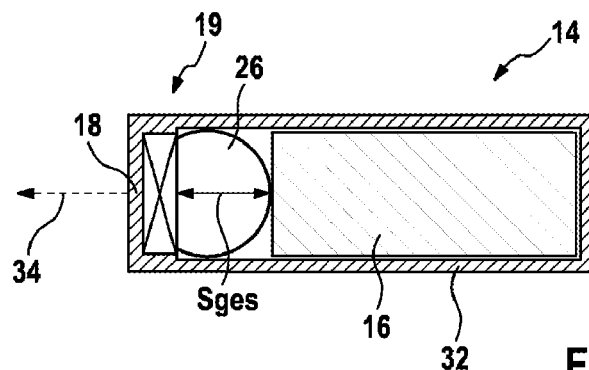
Figure 1G:
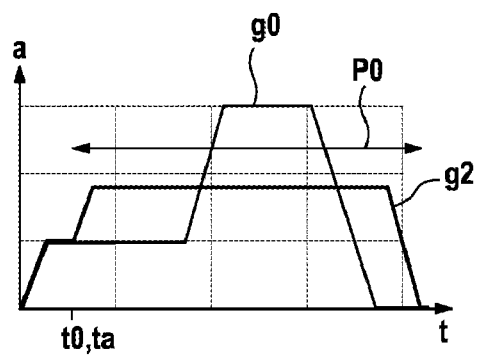
Figure 1H:
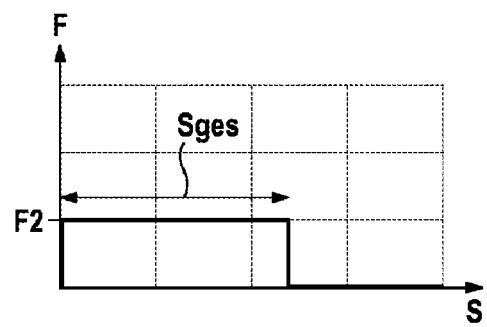

FIGS. 1f to 1h show a first object protection mode, which can additionally be implemented by means of the control device 12 and the dampening device 19. (The abscissas and ordinates of the coordinate systems of FIGS. 1g and 1h correspond to the coordinate systems of FIGS. 1d and 1e.)

In the first object protection mode the protection of the object 16 has priority. This is morally acceptable, because the object protection mode can specifically be chosen for cases in which there is no risk of injury for the vehicle occupants. As the costs for the object 16, for example when the object 16 is in the form of a vehicle battery, are often a very large part of the overall vehicle costs, the protection of the object 16 is often very important.

In order to implement the object protection mode, the braking action of the dampening device 19 starts (almost) at the same moment at which the object 16 leaves its predefined fixing position. The onset time to is thus (almost) equal to the exit time t0. For example, it will start immediately after the release of the object 16 by the object fixing device 28 with the inflation of the inflatable device 26 (see FIG. 1f).

The object 16 is thus recoupled to the mass of the vehicle 10 in a timely manner. Therefore no free/undampened displacement of the object 16 is possible. Instead of this, the object 16 that is displaced from the fixing position along the predefined target route Sges is decelerated during a phase P0 by means of the dampening device 19 with a second deceleration force F2 that is smaller than the first deceleration force F1. The object 16 remains coupled to the vehicle 10 during its displacement along the target route Sges. Because there is thus a longer distance to build up the kinetic energy of the object 16, the second dampening force F2 can be selected to be significantly smaller than the first dampening force F1. In this way, significant damage to the object 16 because of an excessively hard contact between the inflatable device 26 and the object 16 can be reliably prevented. The acceleration of the object 16 that can be achieved during the phase P0 is shown by means of the graph g2 in the coordinate system of FIG. 1g. (The graph g0 corresponds to the graph g0 of FIG. 1d that has already been described above.)

Figure 1I:
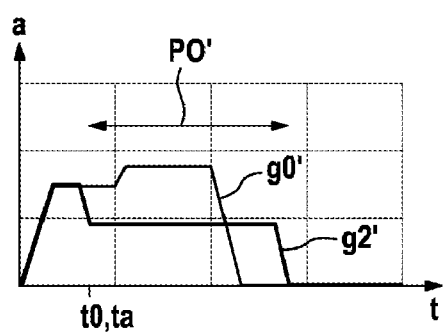
Figure 1J:
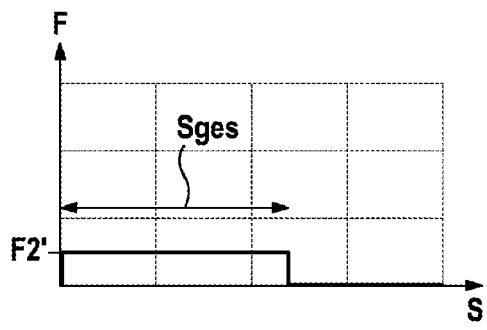

A second object protection mode with a reduced second deceleration force F2' is schematically illustrated by means of the coordinate systems of FIGS. 1i and 1j. (The abscissas and ordinates of the coordinate systems of FIGS. 1i and 1j correspond to the coordinate systems of FIGS. 1d and 1e.)

The magnitude of the reduced second deceleration force F2' can in particular be selected depending on an initial collision speed. A corresponding adjustment of the reduced second deceleration force F2 can be carried out if the control device 12 is configured to specify at least one variable relating to a target current density of the gas flow and/or to a target total volume of the gas flow in the inflatable device 26, taking into account the at least one provided sensor signal 20. In this way the exact volume required to guarantee the desired reduced second deceleration force F2' can be filled into the inflatable device 26.

The graph g2' of the coordinate system of FIG. 1i represents the acceleration a of the object 16. An acceleration a that the vehicle 10 would have if the object 16 remains in its object fixing position during the shorter phase P0' is indicated by means of the graph g0'.

Figure 2A:
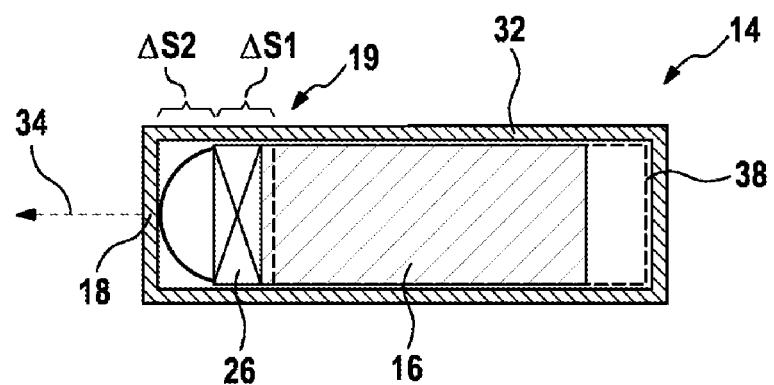
FIGS. 2a and 2b show schematic representations of a second embodiment of the object coupling device.
Figure 2B:
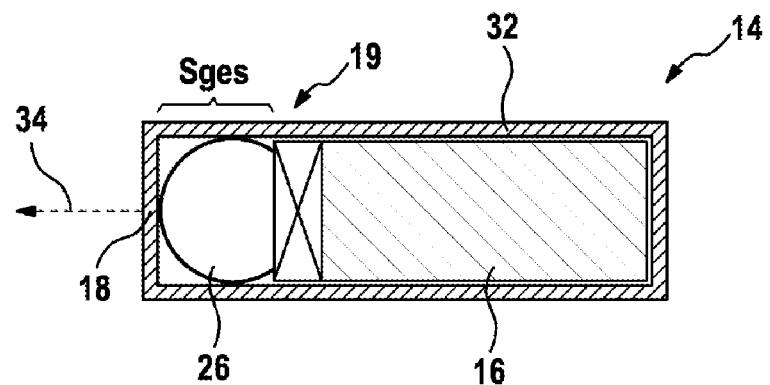

FIGS. 2a and 2b show schematic representations of a second embodiment of the object coupling device.

With the object coupling device 14 schematically represented in FIGS. 2a and 2b, the inflatable device 26 is an airbag 26 directly attached to the object 16. An occupant protection mode can also be implemented with said embodiment, in which following decoupling of the mass of the object 16 from the rest of the vehicle mass the object 16 flies along the first sub path $\Delta s1$ in the direction of travel 34 freely/without dampening. For subsequent recoupling of the mass of the object 16, the airbag 26 is ignited following a defined time difference $\Delta t \neq 0$. This enables the kinetic energy of the object 16 to be built up over the second sub path $\Delta s2$ by the airbag 26 (see FIG. 2a).

As can be seen using FIG. 2b, the object protection mode can also be implemented by means of the inflatable airbag 26 disposed in the object 16. The airbag 26 is again ignited immediately after the decoupling of the object 16. The object 16 is recoupled to the vehicle 10 by the airbag 26 immediately after the decoupling of its mass from the rest of the vehicle mass, but with a lower stiffness (i.e. a smaller gradient of the force-deformation profile).

The two embodiments described above each implement an airbag based system that enables at least one object 16 to be optionally rigidly or flexibly joined to the rest of the vehicle mass. This enables the deceleration acting on the entire vehicle 10 during severe braking/a crash to be influenced such that the load on the occupants and the object 16 is reduced in comparison to a vehicle 10 without such a system.

With the embodiments described above, the desired level of force of the dampening can be relatively freely adjusted by means of the size of an airbag 26 and/or of an internal pressure that is present therein. The level of force of the airbag 26 can in particular be held constant by controlling the internal pressure present therein. For example, venting holes can be formed in the airbag 26. Furthermore, the use of a fully adaptive gas generator that is for example valve-controlled is also conceivable in order to guarantee a constant level of force. The permeability of the material of the airbag can also be selected such that a constant level of force of the airbag 26 can be guaranteed. The shape of the airbag 26 can be round, such as for example with a driver airbag integrated within a steering wheel. The shape of the inflatable airbag 26 can also be rectangular, such as for example with a thorax airbag.

A belt airbag, such as is used for example with a belt bag (inflatable belt) for backseat passengers, can also be used for the dampening device 19. The belt airbag can for example be in the form of a Leporello fold (zigzag fold). Both the top and the bottom can be made of typical belt materials. An airbag internal air pressure airbag chamber can be formed in between the top and bottom. The predefined and always controllable unfolding characteristic in the volume is advantageous with the use of an airbag with a Leporello fold. Thus the effects of the interaction of an unfolding airbag in the Z or vertical direction and hence against possibly vulnerable sides of the object 16 remain controllable. In particular, a bottom or a top of a vehicle battery used as the object 16 can thus be reliably protected.

A further alternative for implementing an inflatable device 26 is an inflatable metal structure.

Figure 3A:
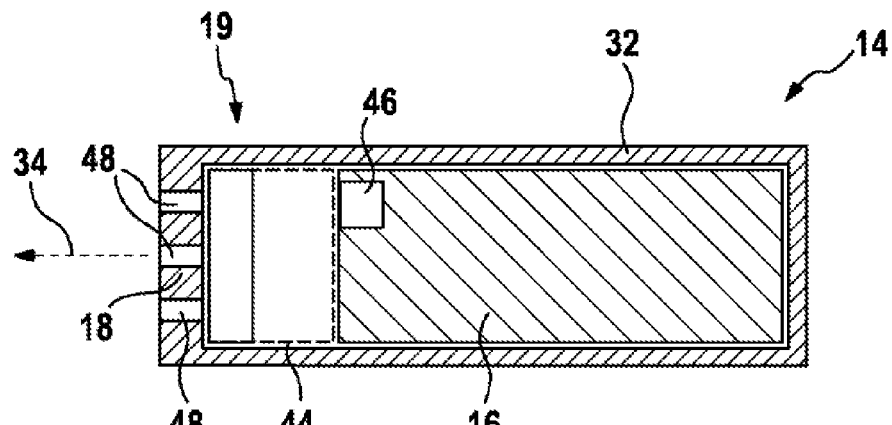
FIGS. 3a and 3b show schematic representations of a third embodiment of the object coupling device.
Figure 3B:
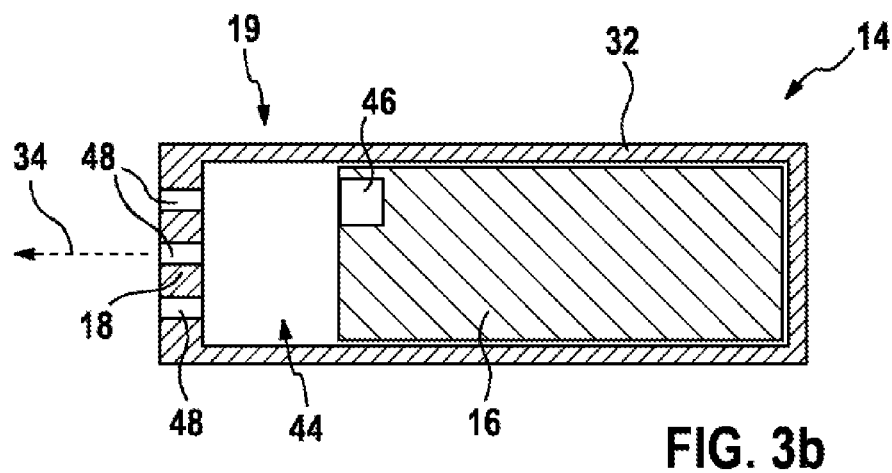

FIGS. 3a and 3b show schematic representations of a third embodiment of the object coupling device.

The object coupling device 14 schematically represented in FIGS. 3a and 3b is configured such that a gas flow (such as for example an air flow) in a (preferably airtight) volume 44 disposed between the object 16 and the target impact component 18 can be activated by means of the at least one control signal 24. The volume can for example be an intermediate component 44 disposed between the object 16 and the target impact component 18 (see FIG. 3a). The space between the object 16 and the target impact component 18 itself can also be placed under pressure as the volume 44 (see FIG. 3b). An airtight form of the space that can be used as the volume 44 can be simply implemented by means of a suitable design of the object coupling device 14.

The gas flow for adjusting the internal pressure in the volume 44 can be effected by means of a gas generator 46. In particular a hot gas generator, a cold gas generator or a pyrotechnic gas generator, or a combination thereof in the form of a hybrid gas generator, can also be used as the gas generator. Optionally, the gas generator 46 can be attached to the object 16. As an alternative, the gas generator 46 can also be disposed externally from the object 16. The internal pressure present in the volume 44 can be additionally controlled by opening and closing at least one valve 48.

In all the embodiments described above, an actuator of the dampening device 19 can have a plurality of switching stages. The actuator can also comprise switching logic, by means of which the target time profile of the dampening to be performed can be adjusted.

Different levels of force are desirable for the occupant protection mode and the object protection mode. The different levels of force for the different strategies can be reliably achieved by different operating stages of the actuator, for example by different ignition stages or a fully adaptive gas generator.

In the embodiments described above the subject matter thereof is configured to decelerate/brake the at least one object in the direction of travel during a crash. It is noted, however, that the design options of an object coupling device 14 are not limited to a defined crash direction, such as in particular a frontal crash. For example, an object coupling device 14 can also be designed to perform its advantageous function during a frontal, side and/or rear crash. In one development an object coupling device 14 can also be designed for a plurality of crash directions.

Figure 4:
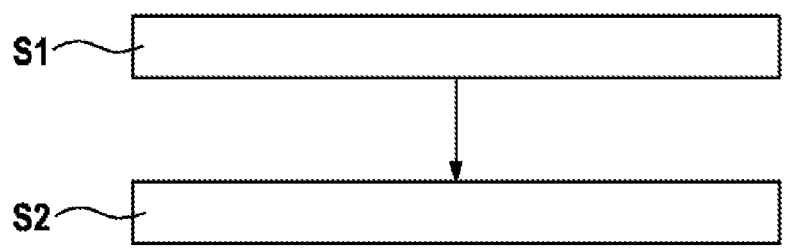
FIG. 4 shows a flow chart for describing an embodiment of the method for the dampening of an impact of an inertially accelerated object.

FIG. 4 shows a flow chart for describing an embodiment of the method for the dampening of an impact of an inertially accelerated object.

The method contributes to the dampening of an impact of an inertially accelerated object. The object can be a mass that is fixed in a predefined fixing position on and/or in an object coupling device during normal travel of a vehicle and that is displaced from the fixing position at an exit time by means of an inertial force along a predefined target route to a target impact component. The object can in particular be at least one vehicle battery. The implementation options of the method are however not limited thereto.

In a step S1 of the method, information is determined relating to the speed of the vehicle, the acceleration of the vehicle, a pressure present in at least one sub volume of the vehicle and/or a crash intensity of a crash of the vehicle. Moreover, a crash severity of a collision and/or information about a collision opponent, such as for example its speed, its weight, its size, its dimension and/or its load state, in particular its (additional) load mass, the number of its vehicle occupants and/or the weight of its vehicle occupants, can be determined and/or called up by means of a suitable information exchange between the vehicle and the other vehicle, in particular by means of GPS. In addition, precrash information, hotspot information for accident black spots, car2car information and/or car2x information can be determined and/or exchanged.

For the performance of the step S1 of the method, often at least one conventional sensor can be used, such as for example at least one speed sensor, at least one acceleration sensor, at least one pressure sensor and/or at least one crash sensor. At least one precrash sensor and/or at least one driver assistance sensor can likewise be used. Such sensors are as a rule already fitted to a vehicle. Thus the vehicle does not have to be fitted with further sensors in order to perform step S1 of the method. The at least one used to perform step S1 of the method can also be provided by mobile terminals.

In a subsequent step S2 of the method a dampening device is activated taking into account the determined information. The activation of the dampening device is carried out such that the object is braked by means of the activated dampening device prior to contact of the object with the target impact component, wherein taking into account the determined information the dampening device is controlled into a target operating mode of at least two operating modes of the dampening device that can be implemented with a different time difference between an exit time of the object from the fixing position and an onset time of a deceleration of the object to be performed by means of the activated dampening device. The at least two operating modes that can be implemented can for example comprise the occupant protection mode and the object protection mode already described above. Therefore reference is only made here to the above remarks regarding the modes that can be used for dampening.

The invention claimed is:

1. A method of operating a control device for an object coupling device of a vehicle, comprising:
   taking into account at least one provided sensor signal of at least one sensor of the vehicle;
   activating a dampening device of the object coupling device via at least one control signal so that an object configured to be fixed in a predefined fixing position on and/or in the object coupling device during normal travel of the vehicle and that is configured to be moved by an inertial force from the fixing position along a predefined target route to a target impact component of the vehicle, is decelerated by the activated dampening device prior to contact of the object with the target impact component; and
   taking into account the at least one sensor signal to determine a target operating mode of the dampening device of at least two operating modes of the dampening device configured to be implemented with a different time difference between an exit time of the object from the fixing position and an onset time of the deceleration of the object to be performed by the activated dampening device and to control the dampening device in the target operating mode by via the at least one control signal.

2. The method as claimed in claim 1, further comprising:
   determining at least one of the respective onset time of the target operating mode and the respective time difference between the exit time and the onset time of the target operating mode; and
   taking into account the at least one sensor signal; and
   activating the dampening device at the onset time via the at least one control signal.

3. The method as claimed in claim 1, further comprising:
   activating at least one of at least one gas generator, at least one closure device, at least one valve, and at least one igniter of the dampening device via the at least one control signal so that a gas flow is initiated in at least one of at least one inflatable device of the dampening device and in a volume disposed between the object and the target impact component.

4. The method as claimed in claim 3, further comprising:
   determining at least one target variable relating to a target power of the at least one gas generator, a target opening duration and/or a target size of the opening gap of the at least one closure device, a target opening duration and/or a target size of the opening gap of the at least one valve, a target number of the gas generators and/or igniters to be activated and/or a target number of the closure devices and/or valves to be opened, taking into account the at least one sensor signal.

5. The method as claimed in claim 1, further comprising:
   taking into account the at least one sensor signal to determine the exit time of the object from the predefined fixing position and to activate an object fixing device of the object arranging device so that the object is released at the determined exit time by the activated object fixing device.

6. An object coupling device for a vehicle configured to work in conjunction with a control device, comprising:
   an object fixing device configured to fix an object in a predefined fixing position on and/or in the object coupling device during normal travel of the vehicle; and
   a dampening device configured to be activated via at least one control signal of the control device so that an object displaceable by an inertial force from the fixing position along a predefined target route to a target impact component is decelerated by the activated dampening device prior to contact of the object with the target impact component,
   wherein the dampening device is controllable via the at least one control signal in a target operating mode of at least two operating modes of the dampening device that are implemented with a different time difference between an exit time of the object from the fixing position and an onset time of a deceleration of the object to be performed by the activated dampening device.

7. The object coupling device as claimed in claim 6, wherein the dampening device comprises at least one of at least one gas generator, at least one closure device, at least one valve, and at least one igniter, which are activated via the at least one control signal so that a gas flow is initiated in at least one of at least one inflatable device of the dampening device, and in a volume disposed between the object and the target impact component.

8. The object coupling device as claimed in claim 7, wherein the dampening device comprises at least one of at least one airbag, at least one belt-integrated airbag, and at least one inflatable metal structure as the at least one inflatable device.

9. The object coupling device as claimed in claim 6, wherein the dampening device is configured implement an occupant protection mode in which the object displaced from the fixing position is displaced along a first sub path of the predefined target route without dampening and is decelerated with a first deceleration force along a second sub path of the predefined target route by the dampening device.

10. The object coupling device as claimed in claim 9, wherein an additional object protection mode is implemented by the dampening device, in which mode the object displaced from the fixing position along the predefined target route by the dampening device is decelerated with a second deceleration force that is smaller than the first deceleration force.

11. The object coupling device as claimed in claim 6, wherein the object fixing device is controlled from a first mode, in which the object is fixed in the fixing position by the object fixing device, into a second mode configured release the object from the fixing position from when the object fixing device is controlled into the second mode.

12. The object coupling device as claimed in claim 11, wherein the object fixing device is controlled from the first mode into the second mode by the control device.

13. The object coupling device as claimed in claim 6, wherein the object coupling device comprises a guide structure configured to guide the object that is displaceable by the inertial force along the predefined target route.

14. The object coupling device as claimed in claim 6, wherein:
   the object coupling device includes the control device, and
   the control device is configured to
      take into account at least one provided sensor signal of at least one sensor of the vehicle,
      activate the dampening device of the object coupling device via the at least one control signal so that the object configured to be fixed in the predefined fixing position on and/or in the object coupling device during normal travel of the vehicle and that is configured to be moved by the inertial force from the fixing position along the predefined target route to the target impact component of the vehicle, is decelerated by the activated dampening device prior to contact of the object with the target impact component, and take into account the at least one sensor signal to determine the target operating mode of the dampening device of at least two operating modes of the dampening device configured to be implemented with the different time difference between the exit time of the object from the fixing position and an onset time of the deceleration of the object to be performed by the activated dampening device and to control the dampening device in the target operating mode by via the at least one control signal.

15. A method for dampening an impact of an inertially accelerated object, which is fixable in a predefined fixing position on and/or in an object coupling device during normal travel of a vehicle and which is displaceable from the fixing position at an exit time by an inertial force along a predefined target route to a target impact component, comprising:

determining information relating to at least one of a speed of the vehicle, an acceleration of the vehicle, a pressure present in at least one sub volume of the vehicle, and a crash intensity of a crash of the vehicle;

activating a dampening device taking into account the determined information such that the object is braked by the activated dampening device prior to a contact of the object with the target impact component; and controlling the dampening device, taking into account the determined information, in a target operating mode of at least two operating modes of the dampening device that are implemented with a different time difference between the exit time of the object from the fixing position and an onset time of a deceleration of the object to be performed by the activated dampening device.

* * * * *